US007322010B1

(12) United States Patent
Mikula

(10) Patent No.: US 7,322,010 B1
(45) Date of Patent: Jan. 22, 2008

(54) GRAPHICAL USER INTERFACE FOR MAPPING COMPUTER RESOURCES

(75) Inventor: Mitchell B. Mikula, Austin, TX (US)

(73) Assignee: Symantec Operating Corporation, Mountain View, CA (US)

( * ) Notice: Subject to any disclaimer, the term of this patent is extended or adjusted under 35 U.S.C. 154(b) by 670 days.

(21) Appl. No.: 10/774,039

(22) Filed: Feb. 6, 2004

(51) Int. Cl.
*G06F 15/177* (2006.01)

(52) U.S. Cl. ...................................................... 715/734

(58) Field of Classification Search ................. 715/734
See application file for complete search history.

(56) References Cited

U.S. PATENT DOCUMENTS 5,598,563 A 1/1997 Spies
5,708,604 A 1/1998 Fontana et al.
5,708,654 A 1/1998 Arndt et al.
5,715,456 A 2/1998 Bennett et al.
5,732,282 A 3/1998 Provino et al.
5,802,365 A 9/1998 Kathail et al.
5,890,204 A * 3/1999 Ofer et al. .................. 711/111
6,078,990 A * 6/2000 Frazier ....................... 711/114
6,170,055 B1 1/2001 Meyer et al.
6,185,686 B1 2/2001 Glover
6,729,011 B2 8/2001 Muhlestein
6,346,954 B1 * 2/2002 Chu et al. ................... 715/764
6,535,998 B1 3/2003 Cabrera et al.
6,640,291 B2 10/2003 Fujibayashi et al.
6,654,830 B1 * 11/2003 Taylor et al. ................. 710/74
6,681,323 B1 1/2004 Fontanesi et al.
6,725,715 B2 4/2004 Igarashi et al.
6,735,715 B1 5/2004 Graham
6,748,429 B1 6/2004 Talluri et al.
6,760,787 B2 7/2004 Forin
6,820,035 B1 * 11/2004 Zahavi ....................... 702/182
6,836,830 B1 12/2004 Yamagami et al.
7,107,534 B1 * 9/2006 de Jong et al. ............. 715/734
7,146,387 B1 * 12/2006 Russo et al. ................ 707/204
2002/0016792 A1 2/2002 Ito et al.

(Continued)

OTHER PUBLICATIONS

"Automated System Recovery with VERITAS Netbackup™," VERITAS Bare Metal Restore, White Paper, VERITAS Software Corp. 2002, pp. 1-10.

(Continued)

*Primary Examiner*—Kristine Kincaid
*Assistant Examiner*—Le Nguyen
(74) *Attorney, Agent, or Firm*—Lawrence J. Merkel; Meyertons, Hood, Kivlin, Kowert & Goetzel, P.C.

(57) ABSTRACT

In one embodiment, a computer accessible medium comprises a plurality of instructions. The plurality of instructions, when executed, present a graphical view of a first computer system configuration and a second computer system configuration. The first computer system configuration comprising a first plurality of computer system resources. Similarly, the second computer system configuration comprises a second plurality of computer system resources. The plurality of instructions, when executed, also provide a mechanism to capture data representing at least a first resource of the first plurality of computer system resources from the first computer system configuration and insert the data in the second computer system configuration. A similar method and computer system are contemplated. In some embodiments, the computer system resources include one or more volumes and mappings to one or more storage devices.

38 Claims, 9 Drawing Sheets

Mapping Tool
Action View
Zoom In | Zoom Out | View Side by Side | View Stacked
Original Disk Layout
96
Disk 0 Basic 18.62 GB | (C:) 2.93 GB NTFS | Volume (H:) 996 MB NTFS | Free Space 14.72 GB
Disk 1 Dynamic 18.62 GB | Volume (E:) 1.95 GB NTFS | Volume (F:) 1000 MB NTFS 108E | Volume (G:) 1.46 GB NTFS
Disk 2 Dynamic 111.76 GB | Volume (E:) 1.95 GB NTFS | Free Space 109.8 GB
Mapped (New) Disk Layout
Drag and Drop 114
98
Disk 0 16.95 GB | Free Space 16.95 GB
Disk 1 16.95 GB 106B | Free Space 16.95 GB | Volume (F:) 1000 MB NTFS 112
Disk 2 16.95 GB | Free Space 16.95 GB
Disk 3 16.95 GB | Free Space 16.95 GB
Primary Unallocated Striped Simple Done

U.S. PATENT DOCUMENTS

2002/0019908 A1* 2/2002 Reuter et al. ............... 711/112
2003/0028725 A1 2/2003 Naberhuis et al.
2003/0074527 A1* 4/2003 Burton et al. ............... 711/114
2003/0159070 A1 8/2003 Mayer et al.
2003/0195995 A1 10/2003 Tabbara
2004/0091175 A1* 5/2004 Beyrouti ..................... 382/305
2004/0111250 A1 6/2004 Hensley
2004/0172512 A1 9/2004 Nakanishi et al.
2004/0205310 A1 10/2004 Yamagami

OTHER PUBLICATIONS

"PowerQuest Drive Image 7.0,"User Guide, May 2003 PowerQuest Corp., pp. 43-63.
"Drive Image 2002," PowerQuest Corp. 2002, 2 pages.
"VERITAS Backup Exec™ 0.1 for Windows Servers," Intelligent Disaster Recovery™ Option, White Paper, VERITAS Software Corp. 2002, pp. 1-9.

* cited by examiner

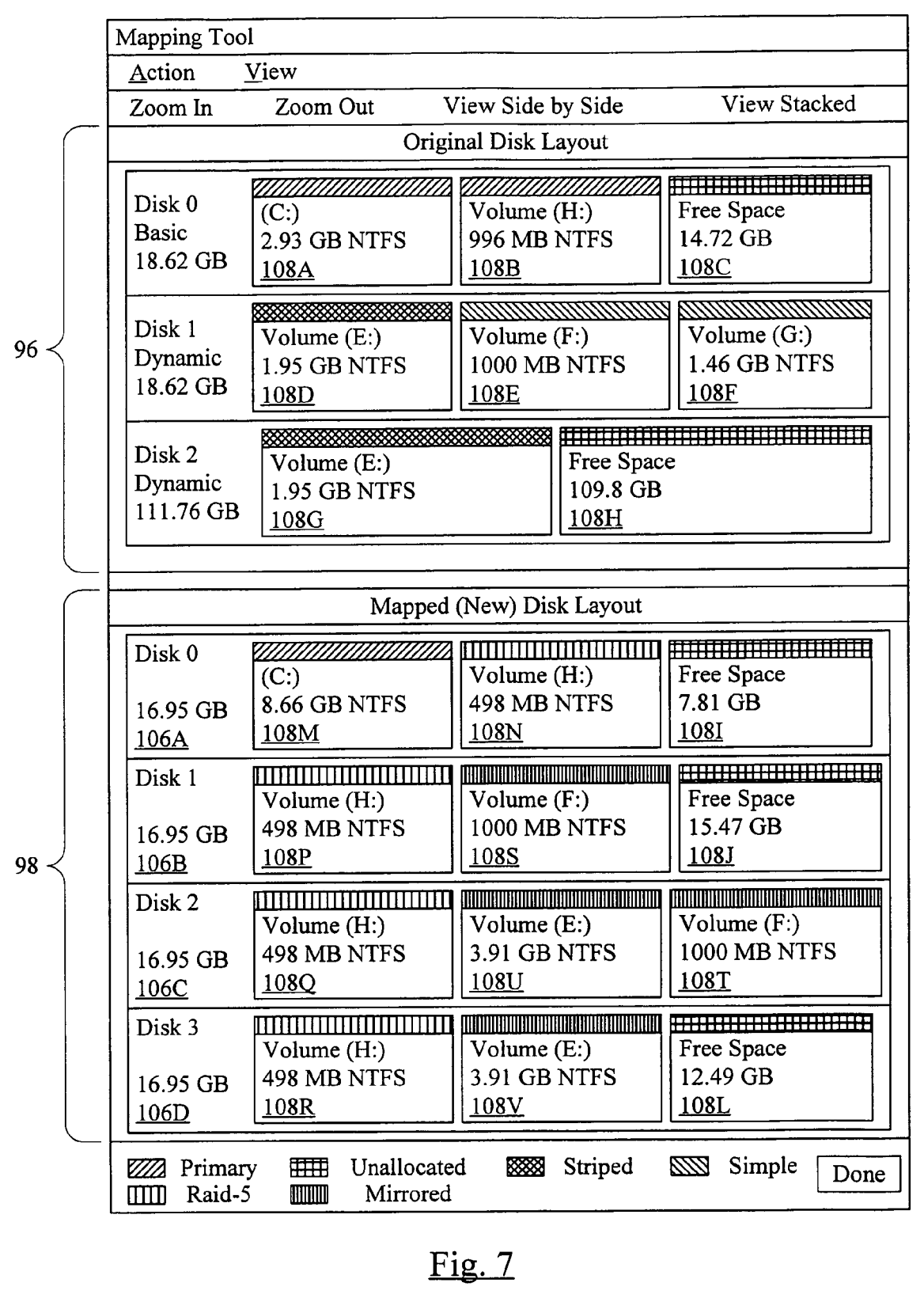

Mapping Tool
Action View
Zoom In Zoom Out View Side by Side View Stacked

96

Original Disk Layout

Disk 0
Basic
18.62 GB
(C:)
2.93 GB NTFS
108A
Volume (H:)
996 MB NTFS
108B
Free Space
14.72 GB
108C Disk 1
Dynamic
18.62 GB
Volume (E:)
1.95 GB NTFS
108D
Volume (F:)
1000 MB NTFS
108E
Volume (G:)
1.46 GB NTFS
108F Disk 2
Dynamic
111.76 GB
Volume (E:)
1.95 GB NTFS
108G
Free Space
109.8 GB
108H

98

Mapped (New) Disk Layout

Disk 0
16.95 GB
106A
(C:)
8.66 GB NTFS
108M
Volume (H:)
498 MB NTFS
108N
Free Space
7.81 GB
108I Disk 1
16.95 GB
106B
Volume (H:)
498 MB NTFS
108P
Volume (F:)
1000 MB NTFS
108S
Free Space
15.47 GB
108J Disk 2
16.95 GB
106C
Volume (H:)
498 MB NTFS
108Q
Volume (E:)
3.91 GB NTFS
108U
Volume (F:)
1000 MB NTFS
108T Disk 3
16.95 GB
106D
Volume (H:)
498 MB NTFS
108R
Volume (E:)
3.91 GB NTFS
108V
Free Space
12.49 GB
108L Primary Unallocated Striped Simple Done
Raid-5 Mirrored

Fig. 7

GRAPHICAL USER INTERFACE FOR MAPPING COMPUTER RESOURCES

BACKGROUND OF THE INVENTION

1. Field of the Invention

This invention is related to the field of computer resource management and, in some embodiments, managing storage resources in a computer system.

2. Description of the Related Art

Various software tools exist for managing/modifying the configuration of a computer system. For example, there are tools for managing the software configuration (e.g. installing and removing software components as desired) as well as for managing the hardware configuration. Hardware configuration tools may include various tools for managing the storage devices in the computer system, and particularly the mapping of volumes to the storage devices. For example, tools involved in the restoration of a computer system from a backup image as well as tools involved in managing storage configuration on a functioning system (e.g. volume management tools and/or filesystem tools) may manage the mapping of volumes to storage devices.

Generally, the various configuration tools present a text or graphical view of the current configuration of a computer system and permit a user to make changes to the configuration. The changes are implemented on the current configuration, and the updated configuration may then be presented. While such an interface permits changes to be made, it is difficult for the user to envision the effect of the changes on the configuration prior to actually making the changes on the computer system. If the change has an undesirable effect, the user must then reverse the change. Both effecting the change and reversing the change may be lengthy, time-consuming operations. Also, in some cases, a change may not be reversible.

Exemplary configuration tools may include various volume management tools, which present the user with the current mapping of volumes to storage devices in the computer system and allow the user to make changes to the volume mapping. Exemplary products may include the VERITAS Volume Manager™ available from VERITAS Software Corporation (Mountain View, Calif.), including the VERITAS Visual Administrator™ or the VERITAS Enterprise Administrator™. Exemplary products further include the Windows Disk Administrator in the Windows™ operating system from Microsoft Corp. (Redmond, Wash.). Other tools may include tools involved in the restoration of a backed-up image of a computer system (either to that computer system or to a different computer system). Some such tools (e.g. the VERITAS Bare Metal Restore™ product from VERITAS Software Corporation) permit the user to change certain volume attributes as part of the restoration.

SUMMARY OF THE INVENTION

In one embodiment, a computer accessible medium comprises a plurality of instructions. The plurality of instructions, when executed, present a graphical view of a first computer system configuration and a second computer system configuration. The first computer system configuration comprising a first plurality of computer system resources. Similarly, the second computer system configuration comprises a second plurality of computer system resources. The plurality of instructions, when executed, also provide a mechanism to capture data representing at least a first resource of the first plurality of computer system resources from the first computer system configuration and insert the data in the second computer system configuration. A similar method and computer system are contemplated.

In another embodiment, a computer accessible medium comprising a plurality of instructions which, when executed, present a graphical view of a first configuration comprising a first mapping of one or more volumes to one or more storage devices. The plurality of instructions, when executed, also present a graphical view of a second configuration comprising a second mapping of one or more volumes to one or more storage devices. Furthermore, the plurality of instructions, when executed, provide a mechanism to capture data representing at least a first volume from the first mapping and insert the data in the second configuration.

BRIEF DESCRIPTION OF THE DRAWINGS

The following detailed description makes reference to the accompanying drawings, which are now briefly described.

FIG. 7 is a block diagram of one embodiment of a user interface provided by the mapping tool, illustrating an example of mapping.

Figure 1:
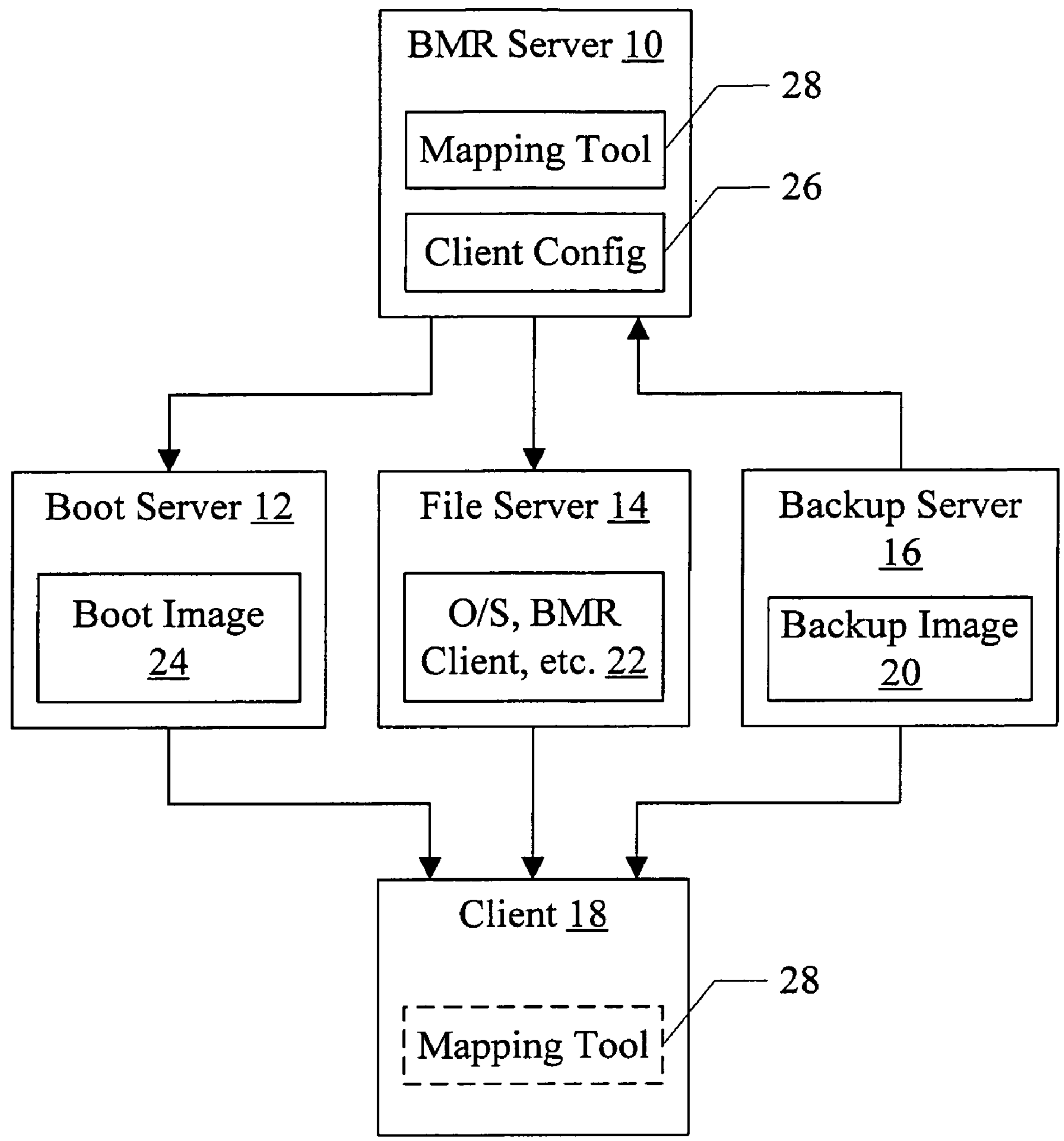
FIG. 1 is a block diagram of one embodiment of a system including a set of servers and a client.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

The mapping tool described herein may be applicable with a variety of different configuration tools. An example will first be described with regard to a system restoration tool. Additional examples are also described for other types of configuration tools. The examples given are not meant to be exhaustive. Any configuration tool may implement the mapping described herein.

Turning now to FIG. 1, a block diagram of one embodiment of a system comprising several servers and a client is shown. In the illustrated embodiment, a bare metal restore (BMR) server 10, a boot server 12, a file server 14, a backup server 16, and a client 18 are shown. The BMR server 10 is coupled to the boot server 12, the file server 14 and the backup server 16. The BMR server 10 may also be coupled to the client 18, in some embodiments. The client 18 is coupled to the boot server 12, the file server 14 and the backup server 16. FIG. 1 is illustrative of logical relationships between the servers and client. Physical connection may be established in any desired fashion (e.g. any type of network, combinations of networks, shared memory, etc.).

The client 18 comprises a computer system that may be restored using the servers 10, 12, 14, and 16. That is, the data to be stored on the client 18 is backed-up in a backup image 20 on the backup server 16. The data may have been backed up from the client 18 previously, and may be restored due to a failure in the client 18 (either hardware, software, or a combination thereof) or other loss of the data in the client 18. Alternatively, the data may have been backed up from another computer system (not shown) that subsequently experienced an irreparable failure or is otherwise being replaced by the client 18. The backup server 16 may implement any backup solution (e.g. the VERITAS NetBackup™ product from VERITAS Software Corporation, or any other VERITAS backup product or backup product from any other vendor).

At the time the backup is performed, a record is made of the system configuration. The record is illustrated as the client configuration file 26 on the BMR server 10 in FIG. 1, although the record may be stored in any form. In some embodiments, the client configuration file 26 may be part of the backup image 20 as well, or the client configuration file 26 may be stored only as part of the backup image 20 and may be retrieved by the BMR server 10 when a client restore is to be performed. The record may be created by BMR software (e.g. either the client software executing on the client being backed up, or by the server software on the BMR server 10).

The client configuration file 26 may store various information describing the client system configuration. For example, the system configuration may include the number, type, and size of storage devices in the client system. The system configuration may further include an identification of the volumes on the storage devices, including the layout of volumes on the storage devices and the attributes of the volumes. Other system configuration data may include the number and type of processors, the amount of memory, and information on other peripheral devices such as network interface hardware, printer hardware, user interface devices, etc.

The file server 14 may provide the client 18 with various software (reference numeral 22) used during the restore process, which may include the operating system software (e.g. operating system commands and libraries), BMR client software, backup client software, etc. The file server 14 may implement any file system usable over a network (e.g. network file system (NFS), Server Message Block (SMB) for Microsoft Windows™ or Samba for Unix-like implementations, etc.). The boot server 12 may be used to provide a boot image 24 to the client 18. When the client 18 is booted to perform a restore, the client 18 may use standard network boot protocols to boot using the boot image 24. The boot image 24 may include a customized boot procedure created by the BMR server 10 to restore the client 18 to the state corresponding to the backup image 20 (including the data in the backup image 20, along with the configuration of the computer system at the time of the backup). In some embodiments, a media boot is supported in which the boot image 24 and software 22 are stored on a computer accessible medium such as a compact disc, and the disc is used to boot the client 18. In such embodiments, the boot server 12 and the file server 14 may be eliminated.

In one embodiment, each of the BMR server 10, the boot server 12, the file server 14, and the backup server 16 may comprise computer systems configured to execute the corresponding server software. In some embodiments, one or more of the servers 10, 12, 14, and 16 may be combined onto the same physical computer system, as desired.

As part of the customized boot procedure, the configuration of the client's storage subsystem is restored. As mentioned above, in some cases, the client 18 may have a different set of storage devices then that indicated in the client configuration file 26. For example, different sets of storage devices may be encountered if the client 18 is a different physical computer system than the computer system that was backed-up to create the backup image 20, or if a storage device or devices are replaced with different devices. The BMR server 10 may permit the restoration to the different disk configuration. In the illustrated embodiment, a mapping tool 28 is provided to allow the user to map the volumes identified in the client configuration file 26 to the storage devices included in the client 18. Additionally, the mapping tool 28 may permit various attributes of the volumes to be changed by the user. In some embodiments, the mapping tool 28 may execute on the BMR server 10. In other embodiments, the mapping tool 28 may execute elsewhere (e.g. on the client 18, as illustrated in dotted form in FIG. 1).

The mapping tool 28 may graphically display the storage system configuration from the backed-up system (referred to as the "original configuration") and a storage system configuration developed by the user (referred to as the "new configuration"). Both the original configuration and the new configuration may be visible to the user. For example, the original configuration and the new configuration may be displayed in separate panels within the same window. Alternatively, the original configuration and the new configuration may be displayed in separate windows, which may be moved, resized, etc. separately and which may be permitted to overlap each other on the display screen.

The mapping tool 28 may also provide one or more mechanisms for capturing data from the original configuration and inserting the data in the new configuration. The data may represent one or more resources in the original configuration (e.g. one or more volumes, in this embodiment). For example, the data may describe the resource and its attributes (e.g. the volume name, its size, and other volume attributes, if any). Various capturing mechanisms may be supported. For example, the mapping tool 28 may support a "drag and drop" mechanism. In a drag and drop mechanism, a user may use a user interface device to select a graphical element and to either move the graphical element to another location on the screen or make a copy of the graphical element in the other location on the screen by manipulating the user interface tool to indicate the other location. In some embodiments, the selected graphical element may move around the screen in response to manipulations of the user interface tool, providing the visual effect of "dragging" the graphical element around the screen. In the present embodiment, the graphical elements may include graphical depictions of storage devices and volumes on the storage devices. Thus, a user may capture data representing a volume by dragging the graphical element corresponding to the volume from the original configuration panel to the new configuration panel, and may insert the data representing the volume into the new configuration by dropping the graphical element on the depiction of the desired storage device in the new configuration.

For example, the user interface device may be a mouse. The user may select the graphical element by depressing the "left" mouse button while a cursor on the screen (controlled by mouse movements) is over the graphical element. The user may hold the left button down and move the mouse until the cursor is over the desired location. Releasing the mouse button may "drop" the graphical element at the desired location. While a mouse may be used as an exemplary user interface device herein, in other embodiments, other devices may be used. For example, a touch pad that responds to user touch may be used to move the cursor around on the screen (and/or taps on the touch pad may be used in place of the mouse button clicks). In still other embodiments, a display screen that responds to user touch may be a user interface device. Arrow keys or other keys on a keyboard may be used as a user interface device (with each key or key combination indicating a direction of movement on the screen).

In the illustrated embodiment, the mapping tool 28 may initialize the original configuration graphical display by reading the client configuration file 26, and the new configuration graphical display may be empty (e.g. depictions of the storage devices in the client 18 may be displayed without any volumes depicted on them). In some embodiments, a partition may be included in the new configuration to permit temporary installation of the operating system (e.g. some embodiments in which the mapping tool 28 is executed on the client 18 may include such a partition, although other embodiments may execute the mapping tool 28 on the client 18 without such a partition). The user may model various possible mappings of the volumes from the original configuration to the new configuration by dragging and dropping the graphical elements from the original configuration to the new configuration.

In some embodiments, dragging and dropping volumes into the new configuration does not actually effect the configuration on the client 18. Thus, the user may model various configurations until the user is satisfied with the configuration, and then may commit the configuration. In some embodiments, the user may be permitted to temporarily create invalid configurations (e.g. by mapping more volumes to a storage device than the storage device has space for, or violating other constraints on the number/type of volumes on the storage device). Permitting the invalid configurations may provide flexibility to the user interface, allowing less user input to arrive at the desired configuration. Committing the configuration may lead to the implementation of the configuration on the client 18.

In some embodiments, the user may be permitted to change one or more attributes of the volume during the process of mapping volumes to the new configuration. Attributes may include the size of the volume, the volume's type, and various protection/performance features such as mirroring, striping, redundant array of inexpensive disk (RAID) level, spanning, etc. For example, when a graphical element is dropped into the new configuration, the mapping tool 28 may pop up a window with the attributes shown (e.g. a so-called "properties box" in Windows systems) and the user may be permitted to change attributes. Alternatively, the user may select (e.g. "right" click) a graphical element in the new configuration and may select the properties box to modify the attributes. In another embodiment, a wizard may provide a set of steps to guide the user through the process of changing attributes.

In the present embodiment, the original configuration is essentially static. That is the user may not be permitted to change the original configuration. Rather, the user maps volumes from the original configuration to the new configuration.

Other embodiments may support other mechanisms for capturing configuration data from the original configuration and inserting the configuration data in the new configuration. For example, a copy and paste mechanism may be used in which a graphical element is selected, copied to a temporary memory such as the "clipboard" in Windows systems, a target location in the new configuration is selected, and the copied graphical element is pasted from the temporary memory to the target location. Selecting of graphical elements and target locations may, e.g., be performed using the tab key on a keyboard or the mouse. Copying and pasting may be accomplished, e.g., using a key stroke, a combination of key strokes, or a menu selection.

In another embodiment, a wizard may be provided for capturing configuration data from the original configuration and inserting the configuration data in the new configuration. As used herein, a wizard may comprise software code which displays a set of steps as a series of windows, guiding the user through various choices to complete a configuration action. For the present embodiment, for example, the user may select a graphical element in the original configuration and launch a wizard (e.g. from a "right" click drop down menu) to capture the configuration data, optionally modify the volume attributes, and insert the configuration data into the new configuration. The user may be prompted to select one or more storage devices in the new configuration to which the volume is to be mapped, and may be presented with the volume attributes and permitted to change the volume attributes.

As used herein, a graphical view of a configuration may refer to a representation of the configuration, where at least a portion of the representation is provided pictorially on a display device using one or more graphical elements. Each graphical element may be a pictorial representation (that is, at least a portion of its meaning is derived from its appearance on the screen). Graphical views and graphical elements may contain text as well.

It is noted that the term "volume" may refer to any defined amount of storage on one or more storage devices. In addition to its size and the storage device or device on which it is allocated, a volume may, in some cases, have other attributes (e.g. protection/performance features such as mirroring, striping, RAID level, spanning, simple, etc.). The term volume may include, for example, logical volume as used in Unix-type operating systems such as Linux, AIX from IBM Corp., Solaris from Sun Microsystems, etc. The term volume may also include, for example, a volume and/or a volume set as define by various volume manager software such as VERITAS Volume Manager™ from VERITAS Software Corporation. The term volume may further include a partition as used, e.g., in the Microsoft Windows™ and/or disk operating system (DOS) operating systems. A partition may be a division of storage on a single disk drive, isolating the partitioned storage from other storage on the disk drive. Partitions may be primary or extended. The term volume may further refer to volume groups.

Figure 2:
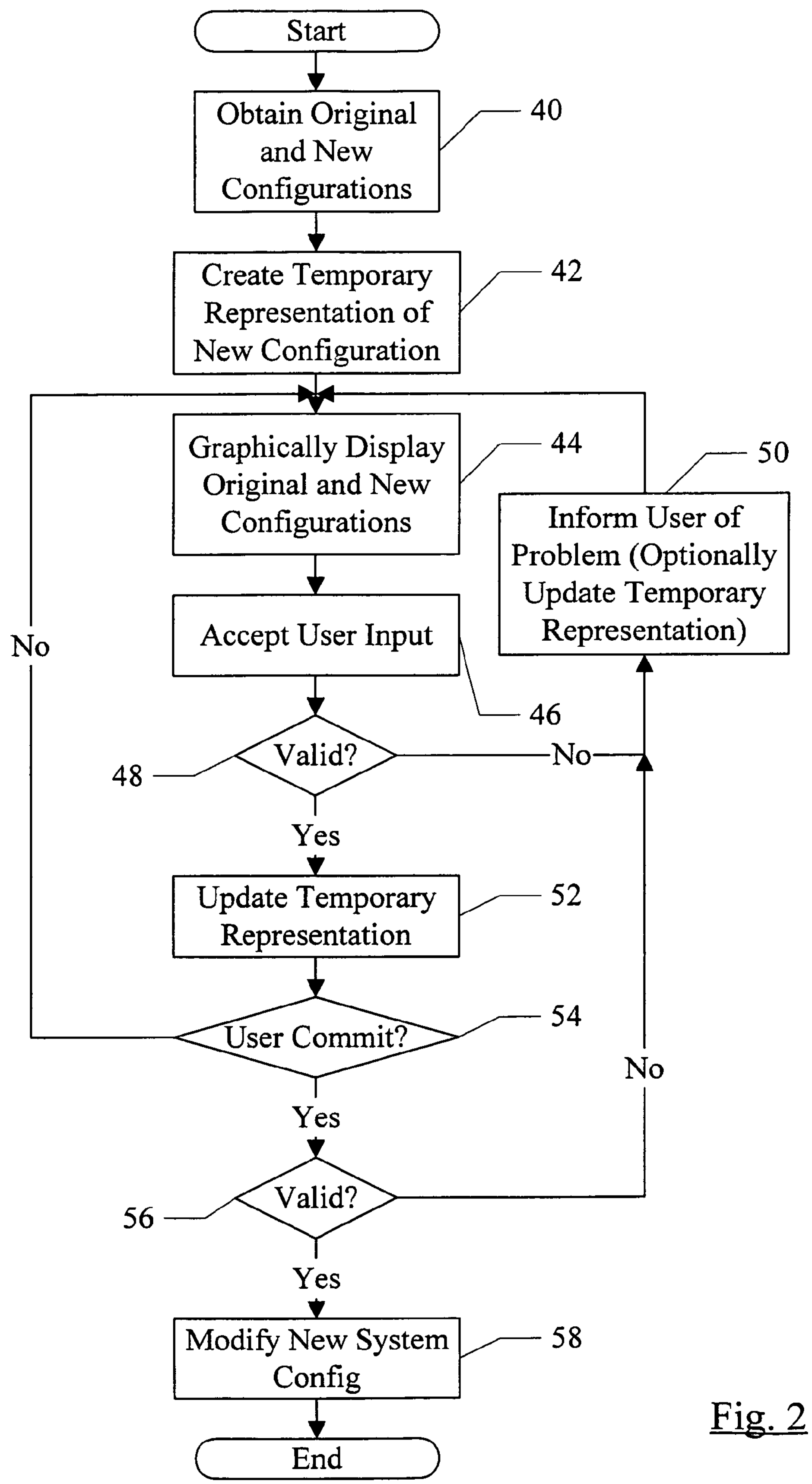
FIG. 2 is a flowchart illustrating operation of one embodiment of a mapping tool that may be used in one embodiment of the system shown in FIG. 1.

Turning next to FIG. 2, a flowchart is shown illustrating operation of one embodiment of the mapping tool 28. The mapping tool 28 may be implemented in software. In such embodiments, the mapping tool 28 may comprise instructions which, when executed, implement the flowchart shown in FIG. 2.

The mapping tool 28 may obtain the original and new configurations (block 40). For example, in the illustrated embodiment, the original configuration may be defined in the client configuration file 26. The new configuration may be obtained from the client 18. In some embodiments, the mapping tool 28 may be supplied with a configuration file similar to the client configuration file 26 that describes the storage devices in the client 18 (e.g. type and size). For example, a discovery process may be performed on the client 18, the results of which may be included in the configuration file corresponding to the client 18. The discovery process may identify the hardware in the client 18, including various storage devices. In some embodiments, the discovery process may include a discovery boot.

The mapping tool 28 may create a temporary representation of the new configuration (block 42). For example, the mapping tool 28 may store a temporary representation in memory on the computer system on which the mapping tool 28 is executing, and/or on a storage device in the computer system. The temporary representation may be updated as data is inserted into the new configuration (e.g. using drag and drop, copy and paste, and/or wizard mechanisms) until the user commits the modifications to the new configuration.

Figure 3:
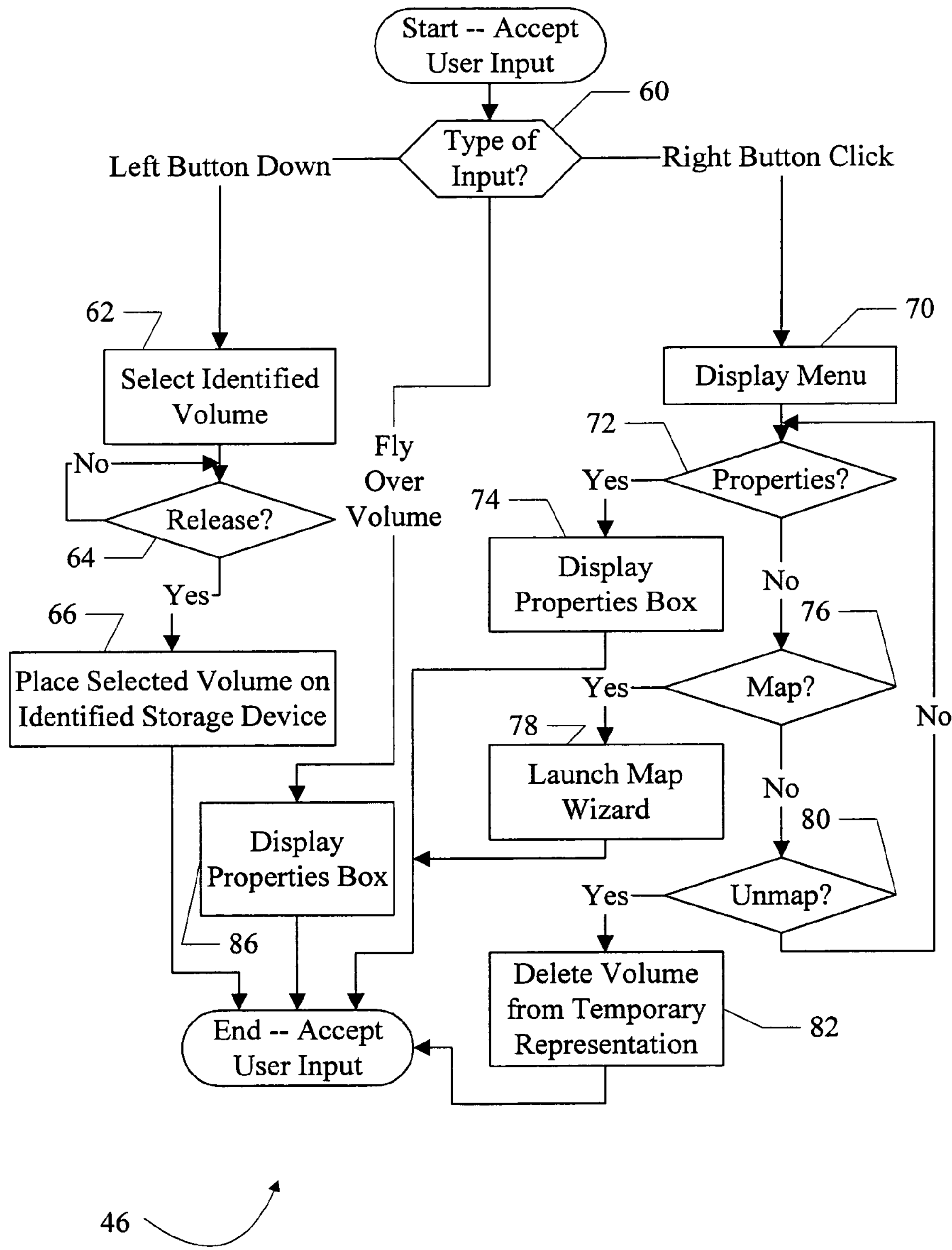
FIG. 3 is a block diagram of one embodiment of accepting user input.

The mapping tool 28 may graphically display the original and new configurations on a display device (e.g. a video monitor) for viewing by the user (block 44) and may accept user input (block 46). User input may be provided using any mechanisms supported by the mapping tool. An example of accepting user input is shown in FIG. 3 and described in more detail below.

In some embodiments, if a user input indicates a modification of the new configuration, the mapping tool 28 may provide at least some validation checking on the modification (decision block 48). For example, the mapping tool 28 may verify that the mapping of volumes to storage devices in the new configuration meets any operating-system specific requirements (if any), that the mapping of volumes to storage devices does not exceed the storage capacity on the storage devices, that the mapping of a volume to two or more storage devices (if any) meets any requirements for such mappings, and/or that any changes to the volume implemented by the user as part of inserting the volume into the new configuration are permissible. An example of operating-system specific requirements, in clients using the Microsoft Windows™ operating system, may include a requirement that partitions and other types of volumes are not mixed on the same storage device and a requirement that a maximum of 4 primary partitions are included on the same storage device. An example of verifying mapping of a volume to two or more storage devices may include, for a striped volume, that each stripe is mapped to a different physical storage device. Similar constraints may exist for mirrored volumes or RAID volumes, in some embodiments. An example of verifying the changes to the volume may include, if a user reduces the size of the volume, that the reduced size is not smaller than the amount of data actually stored in the volume. Any set of validation checking may be implemented in various embodiments. Additionally, not all validation checking may be performed in response to accepting user input. In some embodiments, no validation checking may be performed (that is, decision block 48 may be eliminated).

If a validation check fails (decision block 48, "no" leg), the mapping tool 48 may inform the user of the problem with the mapping (block 50), and may return to block 44 to display the configurations and accept additional input. The mapping tool 48 may inform the user in a variety of fashions, depending on the nature of the problem. For example, if the volumes mapped to a storage device exceed the capacity of the storage device, the user may be informed by altering the display of that storage device and/or the volumes thereon (e.g. coloring the display of the storage device and/or the volumes thereon red, displaying a graphical element that indicates error on or near the depiction of the storage device, etc.). The temporary representation of the new configuration may still be updated in such cases, to permit the user to correct the problem as the user sees fit. As another example, the user may be informed with a pop-up box or other user message interface. The message may describe the problem, and the temporary representation may or may not be updated. In some embodiments, the mapping tool 48 may suggest a correction to the problem in the pop-up box, and the user may accept or reject the suggested correction. If the user accepts the suggested correction, the temporary representation may be updated with the volume and the suggested correction.

If the user's input is valid (decision block 48, "yes" leg), the mapping tool 48 may update the temporary representation of the new configuration to reflect the user's input (block 52). If the user has not committed the new configuration (decision block 54, "no" leg), the mapping tool 28 may return to block 44 to display the configurations (including updates to the new configuration made by the user) and accept additional user input. On the other hand, if the user does commit the new configuration (decision block 54, "yes" leg), the mapping tool 28 may perform validation checks on the new configuration (decision block 56). The validation checks represented by decision block 56 may be similar to the validation checks represented by decision block 48. In some embodiments, some validation checks may be easier to perform after the user has committed the new configuration, or may take longer to perform than may be desirable while the user is providing input. Such validation checks may be performed at decision block 56, while other validation checks may be performed at decision block 48. In other embodiments, all validation checks may be performed at decision block 48 and decision block 56 may be eliminated. In still other embodiments, all validation checks may be performed at decision block 56 and decision block 48 may be eliminated. In yet other embodiments, no validation may be performed and both decision blocks 48 and 56 may be eliminated.

If the new configuration is not valid (decision block 56, "no" leg), the mapping tool 48 may inform the user of the problem (block 50) and may return to block 44 to display the configurations and to accept additional user input (to solve the problem). In some embodiments, the manner in which the user is informed of a particular problem (block 50) may differ if the validation checks are being performed subsequent to the user committing the new configuration (decision block 56) as compared to the validation checks being performed before user commit (decision block 48).

If the new configuration is valid (decision block 56, "yes" leg), the mapping tool 28 may cause the modifications to the new system configuration (block 58). For example, in some embodiments the mapping tool 28 may write out a new client configuration file, similar to the client configuration file 26, that may be used to configure the client 18 in the restore operation. For example, the new client configuration file may be used by the BMR server 10 to generate the customized boot procedure for the client, as described above. In other embodiments, the mapping tool 28 may update the client configuration file 26 rather than creating a new client configuration file. Any mechanism for implementing the new configuration may be used.

Turning now to FIG. 3, a flowchart is shown illustrating one embodiment of accepting user input (block 46 in FIG. 2). The mapping tool 28 may be implemented in software. In such embodiments, the mapping tool 28 may comprise instructions which, when executed, implement the flowchart shown in FIG. 3 for block 46.

The flowchart of FIG. 3 accepts user input using a mouse (and optionally a keyboard in some cases). Other embodiments may employ other user interface devices in addition to, or instead of, a mouse. For the discussion herein, reference may be made to the "left" mouse button and the "right" mouse button. These buttons may refer to the buttons on the left and right of the top side of a standard mouse when viewed by the user. However, which button operates as the "left" and "right" mouse button may be configurable in software. Additionally, various types of mice and/or similar pointer devices may locate the buttons in different places dependent on the design of the device.

It is noted that some of the functionality shown in FIG. 3 may not be part of the mapping tool 28 itself. For example, the functionality may be part of the underlying operating system or user interface (e.g. Windows™, XWindows for Unix-type systems, etc.).

FIG. 3 illustrates three types of user input (block 60). Other embodiments may accept other types of user input in addition to the types shown in FIG. 3 or a subset of the types shown in FIG. 3, or may accept other types of user input instead of the types shown in FIG. 3. If the left button is down (or depressed), the mapping tool 28 may select the volume identified by the mouse (block 62). That is, at the time the left button is depressed, the cursor may be over the identified volume on the screen. If the button has not been released (decision block 64, "no" leg), the mapping tool 28 continues to wait for the button release. During the time that the left button is down, the user may move the mouse to position the selected volume over one of the storage devices in the display of the new configuration. If the button has been released (decision block 64, "yes" leg), the mapping tool 28 may place the selected volume on the identified storage device (block 66). That is, the identified storage device is the storage device over which the cursor is displayed on the screen when the left button is released. Block 66 may involve recording an indication of the storage device so that the mapping tool 28 may update the temporary representation of the new configuration to reflect mapping the volume to the identified storage device. Thus, blocks 62, 64, and 66 may represent an embodiment of a drag and drop mechanism. Various error checking may be performed in various embodiments (not shown in FIG. 3), as desired.

If a right button click has occurred (that is, the right button has been depressed and released in rapid succession), the mapping tool 28 may display a drop-down menu (block 70). Additionally, the volume identified by the cursor may be selected, and any selection from the drop-down menu may be applied to the selected volume. The drop-down menu may include any desired actions. In the present embodiment, the menu may include a properties item, a map item, and an unmap item. If the user selects the properties item (decision block 72, "yes" leg), the mapping tool 28 may display a properties box listing the attributes of the selected volume (block 74). The attributes may include, for example, size, type, attributes, space used in the volume, etc. If the user selects the map item (decision block 76, "yes" leg), the mapping tool 28 may launch the map wizard to guide the user through steps to map the volume to the new configuration (e.g., as described above) (block 78). If the user selects the unmap item (decision block 80, "yes" leg), the mapping tool 28 may delete the selected volume from the temporary representation on the new configuration (block 82). The unmap item may generally be used to undo a modification previously made to the new configuration (e.g. because the user has changed his mind, or to change the results of the quick map feature). Not shown in FIG. 3 is that, if the user clicks somewhere else than on one of the items in the menu, the menu may be closed without any operation being performed (i.e. no menu item is selected). Again, various embodiments may include various error checking, as desired.

In some embodiments, function may be assigned to a "fly over" of a volume. A fly over occurs if the cursor stops over a graphical element but no mouse button is depressed or clicked within a certain period of time after the cursor movement stops. For example, in this embodiment, if a fly over of a volume occurs, the mapping tool 28 may display the properties box for the volume, similar to block 74 (block 86).

It is noted that blocks 72, 76, and 80 may represent independent events and the order of the blocks 72, 76, and 80 is not intended to indicate a program order for processing the events.

FIGS. 4-7 are block diagrams illustrating one embodiment of the user interface provided by the mapping tool 28 for the user. Many variations on the user interface are possible. Any graphical element may be used to illustrate a storage device and/or a volume in various embodiments.

The example of FIGS. 4-7 illustrates disk drives that may be included in original and current configuration. Generally, any type of storage device may be included in various embodiments. As used herein, a storage device may include any sort of computer storage media such as, for example, fixed or removable disk drives, compact-disk (CD) or digital versatile disk (DVD) drives, external disk drives (including solid state drives that comprise non-volatile memory such as Flash memory) coupled via a peripheral interface, tape drives, etc.

Figure 4:
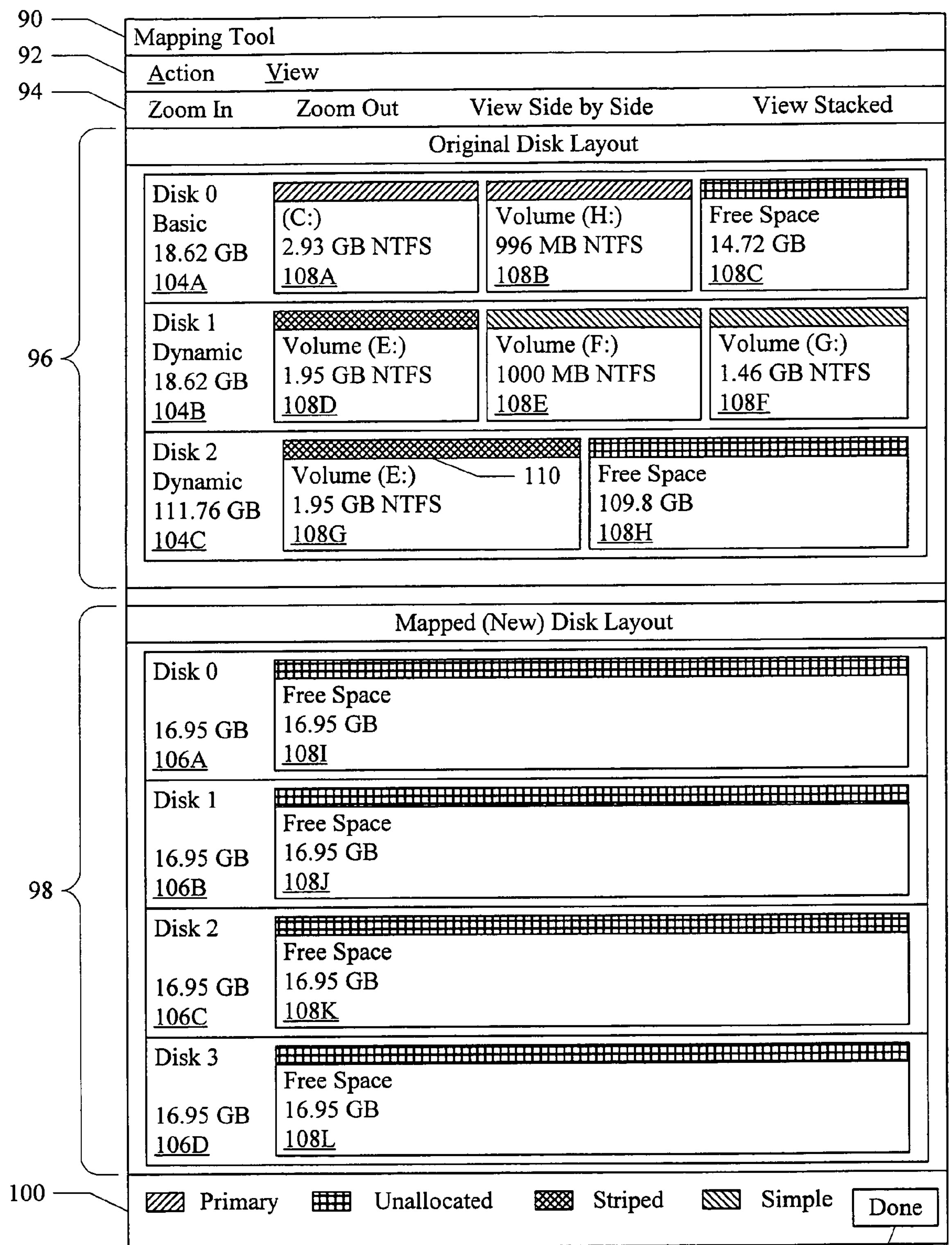
FIG. 4 is a block diagram of one embodiment of a user interface provided by the mapping tool at the start of mapping.

FIG. 4 illustrates an example of the embodiment of the user interface at initialization of the mapping tool. In the illustrated embodiment, the interface may include a title bar 90 that indicates that the window is displaying the mapping tool 28, a menu bar 92, a tool bar 94, an original layout panel 96, and a new layout panel 98, and a bottom bar 100 that displays a key to the color codes in the panels 96 and 98 as well as a done button 102. The example may include, in some cases, terms used in the Microsoft Windows™ operating system. Other embodiments may use the various Unix operating systems or any other operating system or volume manager.

Within each of the panels 96 and 98, graphical elements represent the disk drives (or more briefly "disks") included in the corresponding configuration. For example, in FIG. 4, boxes 104A-104C may represent 3 disks in the original configuration, in the panel 96. The boxes 106A-106D may similarly represent 4 disks in the new configuration, in the panel 98. The number of disks in the original and new configurations may vary from computer system to computer system, and the original configuration may have more or fewer disks than the new configuration.

Each box 104A-104C and 106A-106D may include text that may describe one or more of: a name of the disk (e.g. disk 0, disk 1, etc. in FIG. 4) for user convenience, a size of the disk, and, in the case of the disks in the original configuration, a type (e.g. basic or dynamic, for a Microsoft Windows™ embodiment). Additionally, each box 104A-104C and 106A-106D may include additional graphical elements (e.g. boxes 108A-108L in FIG. 4) representing the volumes mapped to each disk and, optionally, a box 108A-108L per disk representing the free space on that disk. Each box 108A-108L may include text describing the volume and the size, in the illustrated embodiment. Additionally, each box may include a color code in the illustrated embodiment, identifying the type of volume according to the key shown in the bottom bar 100. That is, the key includes the same colors used in the color code, and text identifying the corresponding volume type. For example, in the illustrated embodiment, the color code for each volume may be a colored bar (e.g. reference numeral 110 in box 108G).

FIG. 4 uses various types of fill to represent different colors on the colored bars. In actual implementation, different colors may be used. Alternatively, different fill may be used in other embodiments. Thus, the original configuration in the example of FIG. 4 may include: (i) the C: partition (box 108A) and volume H: (box 108B) as primary partitions on disk 0 (box 104A), and the remaining space on disk 0 may be free space (box 108C); (ii) the volume E: may be a striped volume (boxes 108D and 108G) across disks 1 and 2 (boxes 104B-104C); the volumes F: and G: may be simple volumes on disk 1 (box 104B); and the remainder of disks 1 and 2 may be free space (box 108H for disk 2, box not shown on disk 1 for space reasons on the drawing). Since FIG. 4 illustrates the state at initialization, each of the disks 0 to 4 (boxes 106A-106D) in the new configuration (panel 98) are free space (boxes 108I-108L). Each of the free space boxes 108C, 108H, and 108I-108L may be color-coded as unallocated.

In the illustrated embodiment, each box 108A-108L within a given box 104A-104C or 106A-106D may be the same size for ease of viewing. Thus, as new volume boxes 108A-108L are added to a disk box 106A-106D, the size of the volume boxes may change. In other embodiments, the size of the boxes 108A-108L may be proportional to the size of the corresponding volume as a portion of the total space on the corresponding disk.

The done button 102 may be pressed by the user to commit the modifications to the new configuration (that is, to take the "yes" leg of decision block 54 in the flowchart of FIG. 2). For example, the user may move the mouse to place the cursor over the done button 102, and may depress the left mouse button, to commit the modifications. Alternatively, the user may use the tab key on a keyboard to tab until the done button 102 is highlighted and then may press the enter key to commit the modifications.

The tool bar 94 may provide various tools for the user's convenience. In the illustrated embodiment, for example, the tool bar 94 includes zoom in and zoom out tools as well as tools to view the original and new configurations stacked (as shown in FIG. 4) or side by side. The menu bar 92 may provide various menus for use by the user. For example, the view menu may permit changing of the view to stacked or side to side, similar to the tools on the tool bar 94. Additionally, an action menu may include various actions that may be initiated by the user. In some embodiments, the action menu may include one or more of a quick map item (see FIG. 8 and its description below) or a best fit item (see FIG. 9 and its description below). In other embodiments, the action menu may also include an "unmap all" item that may be used to revert to the initial state shown in FIG. 4 (that is, to remove any modifications to the new configuration). Other embodiments may include other menus or menu items, as desired.

Figure 5:
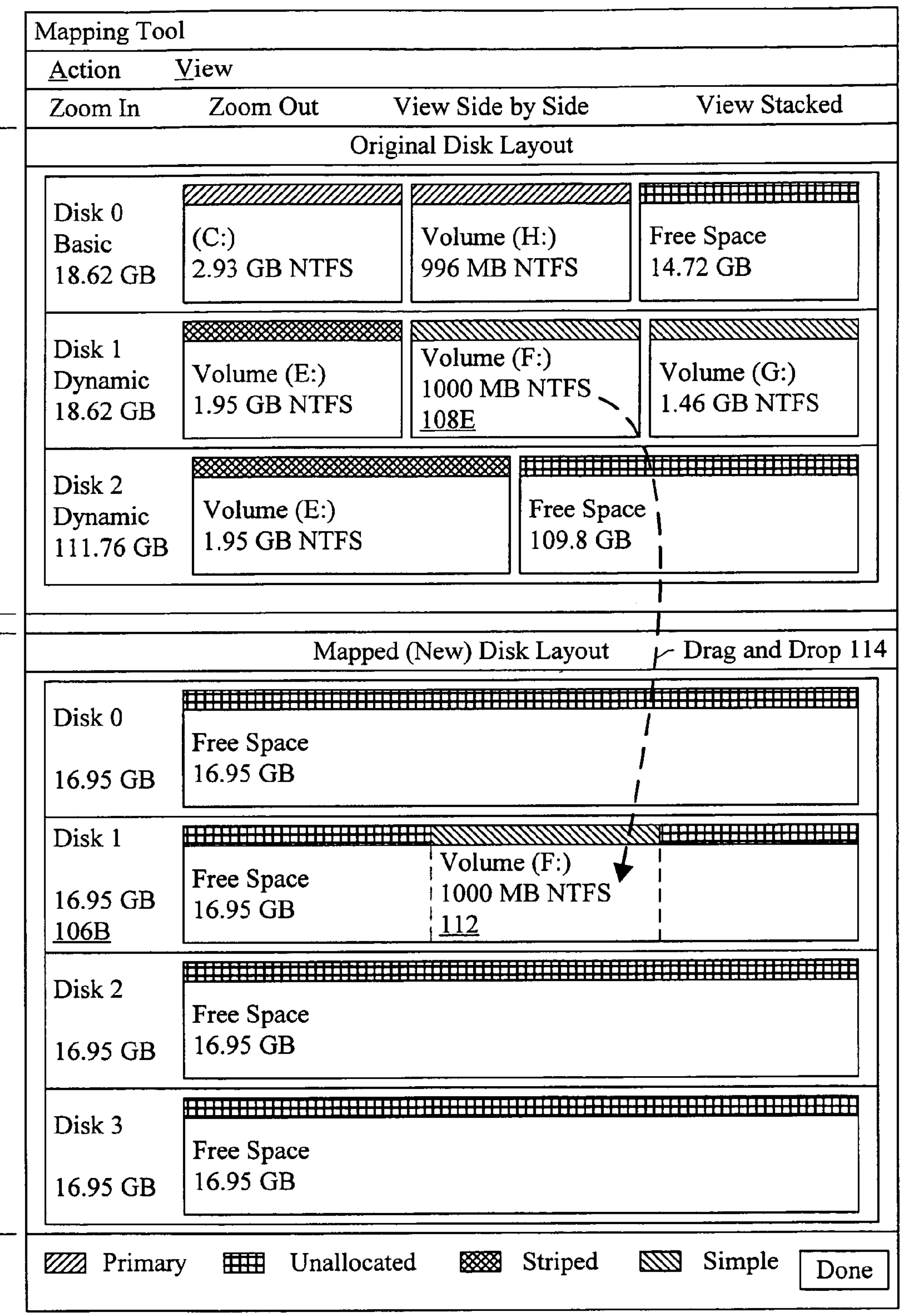
FIG. 5 is a block diagram of one embodiment of a user interface provided by the mapping tool, illustrating a drag and drop function.

FIG. 5 illustrates the example of FIG. 4 and the dragging and dropping of a volume from the original configuration (panel 96) to the new configuration (panel 98). In the example, the volume F: (box 108E) is selected and is dragged to the new configuration (particularly disk 1, box 106B). The heavy dotted arrow 114 illustrates the dragging of the volume. In some embodiments, the volume box may be displayed in ghosted form (e.g. box 112, shown in dotted form to represent ghosting) as it is dragged. In other embodiments, the volume box may be show in normal form, not show at all, or shown in any other desired form as it is dragged.

Figure 6:
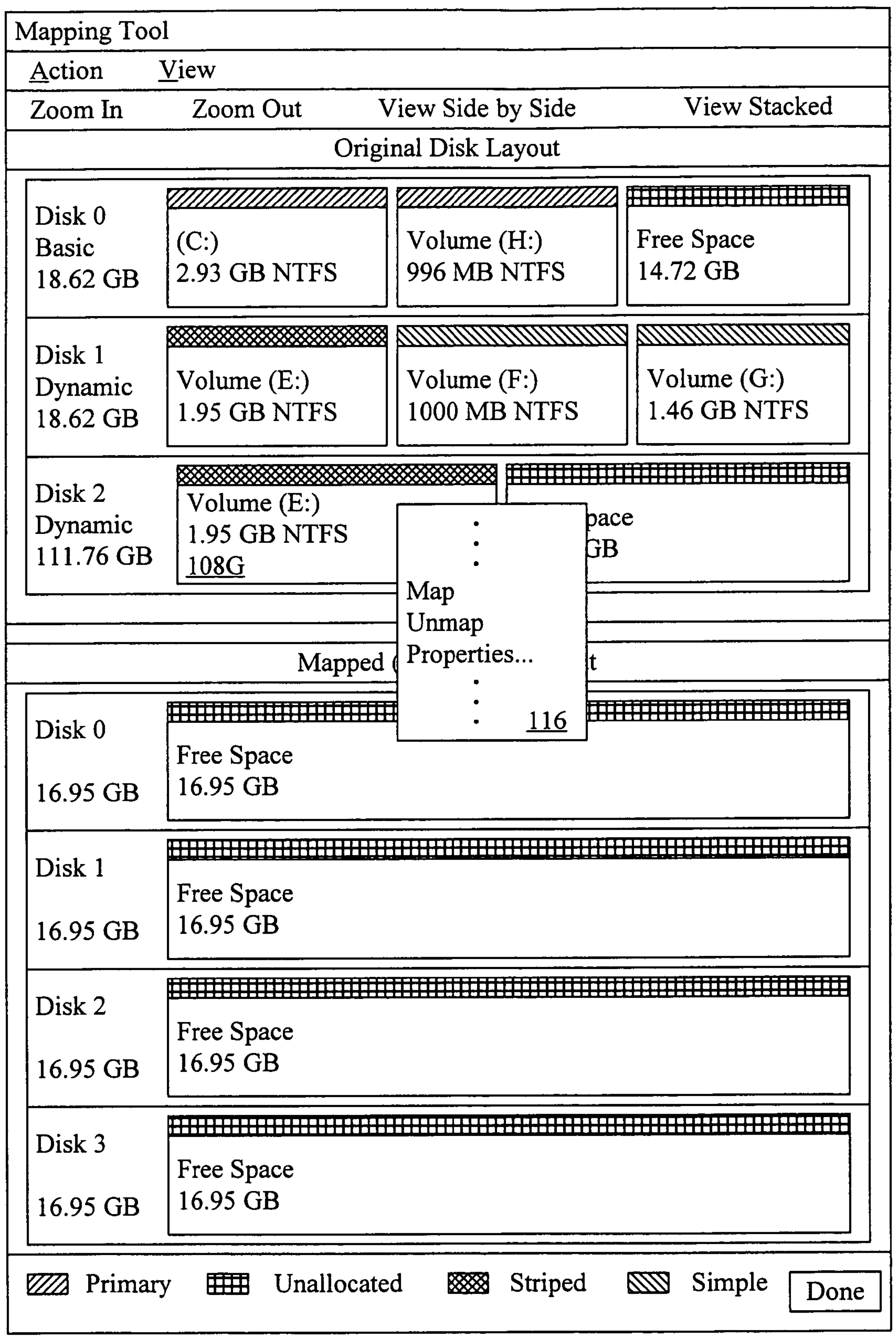
FIG. 6 is a block diagram of one embodiment of a user interface provided by the mapping tool, illustrating a drop down menu.

FIG. 6 illustrates the example of FIG. 4 and a drop down menu. In this example, the user has right-clicked on the volume E: (box 108G) and a drop down menu 116 has been shown. The drop down menu 116 may include at least the map, unmap, and properties items, in the embodiment of FIG. 6. Other menu items may be included as desired in various embodiments.

FIG. 7 is an example illustrating the same original configuration (panel 96) as in FIG. 4, and an exemplary set of new mappings selected by a user for the new configuration (panel 98). In this example, the user had created a C: primary partition (box 108M) on disk 0 (box 106A). The user has also converted the primary partition H: (box 108B) to a RAID-5 volume across all of the disks (boxes 108N, 108P, 108Q, and 108R). Volume F: (box 108E) has been converted from a simple volume to a mirrored volume (boxes 108S and 108T) on disks 1-2 (boxes 106B-106C). Volume E: (boxes 108D and 108G) has been converted from a striped volume to a mirrored volume (boxes 108U and 108V) on disks 2-3 (boxes 106C-106D). Also, in this case, the user has not elected to map the volume G: (box 108F) to the new configuration. If the user so chooses, the user may commit the new configuration and exclude the volume G: from the new configuration.

In the illustrated embodiment, each of the disks 0-3 (boxes 106A-106D) has remaining free space, illustrated by boxes 108I, 108J, and 108L for disks 0, 1, and 3, respectively. The free space box for disk 2 is not shown for space reasons in the figure.

As mentioned above, in some embodiments a quick map feature may be provided (e.g. as a menu item under the action menu). The quick map feature may be provided to automatically map the volumes from the original configuration to the new configuration without changing the attributes of the volumes. By using the quick map feature, most of the work of mapping the volumes to disks may be done. The user may then unmap volumes or modify volumes as desired using the result of the quick map.

Figure 8:
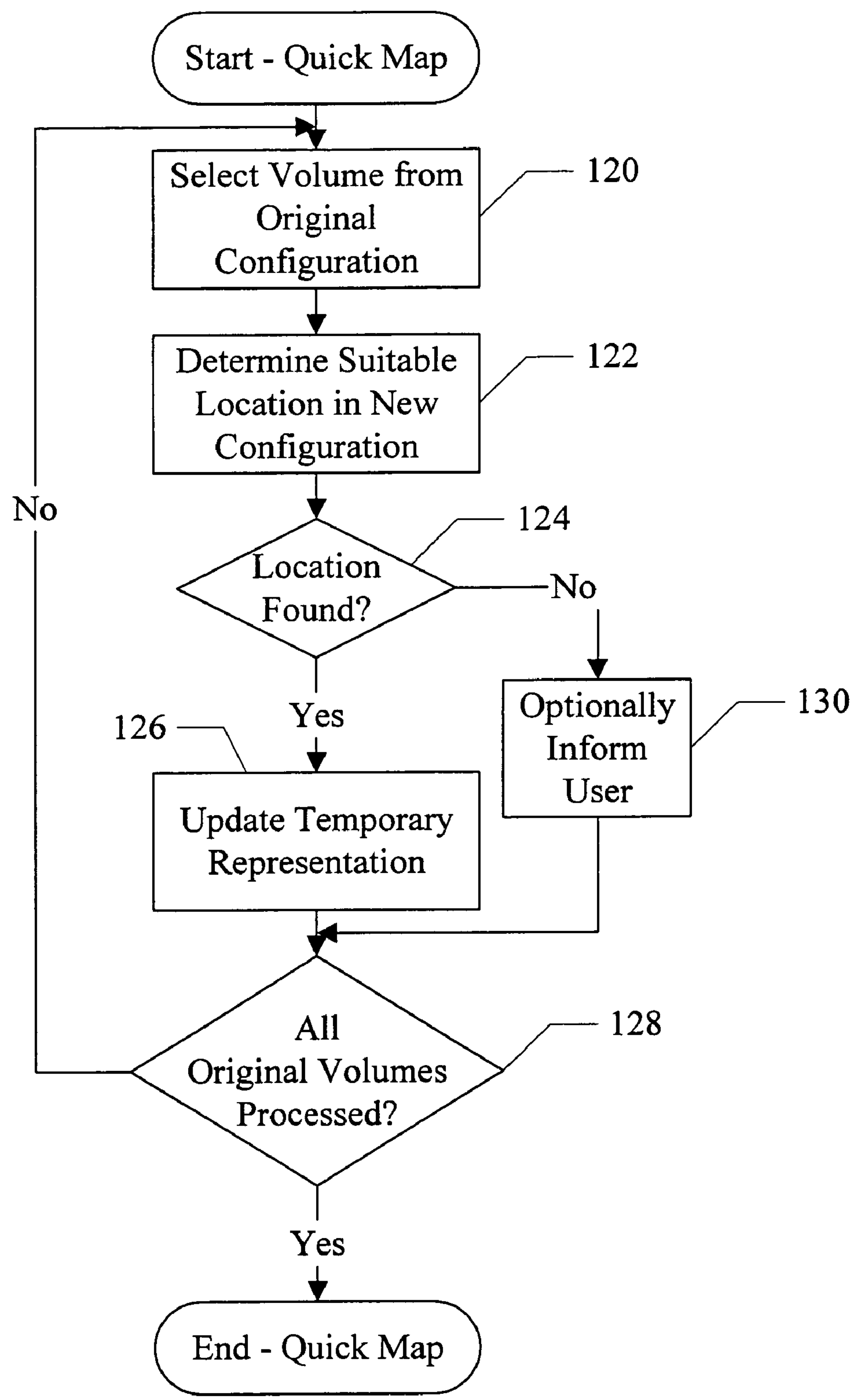
FIG. 8 is a flowchart illustrating operation of one embodiment of a quick map feature.

FIG. 8 is a flowchart illustrating one embodiment of the quick map feature. The mapping tool 28 may be implemented in software. In such embodiments, the mapping tool 28 may comprise instructions which, when executed, implement the flowchart shown in FIG. 8.

The mapping tool 28 may select a volume from the original configuration (block 120). Volumes may be selected in any fashion. For example, volumes may be selected in the order that they occur in the client configuration file 26. Alternatively, the mapping tool 28 may sort the volumes by size, and may map the largest volumes first to increase the likelihood that all the volumes can be mapped automatically (or to increase the number of volumes successfully mapped). Since the largest volumes may be the most difficult to fit into the new configuration, mapping them first may increase the likelihood of success. The smaller volumes may fill the remaining space on the disks in the new configuration. In yet another alternative, the mapping tool 28 may sort by complexity of the volume and may map the more complex volumes first. More complex volumes (e.g. mirrored, striped, spanned, etc.) may require space on multiple disks and thus may be harder to map than simpler volumes. In still another alternative, the mapping tool 28 may sort by both size and by complexity of the volume, and may map the largest and/or most complex volumes first.

The mapping tool 28 may determine a suitable location for the selected volume in the new configuration (block 122). Locations may be selected in any fashion. For example, the disks in the new configuration may be considered in the order listed in the new configuration. If the volume fits on a given disk, it may be mapped to that disk. Alternatively, disks may be sorted by size, speed, etc.

If a suitable location is found (decision block 124, "yes" leg), the mapping tool 28 may update the temporary representation of the new configuration to reflect mapping of the volume to the location (block 126). If additional volumes from the original configuration remain to be processed (decision block 128, "no" leg), the mapping tool 28 may return to block 120 and select the next volume. Otherwise, the quick map feature is finished (decision block 128, "yes" leg).

In some cases, a suitable location for the selected volume may not be found (decision block 124, "no" leg). For example, a large volume may not find enough space on a disk to be mapped. A complex volume may not find enough space on two or more disks to be mapped. If a suitable location may not be found, the mapping tool 28 may optionally inform the user (block 130). For example, a pop window may be used to provide a message to the user, a log file may be updated, etc. The mapping tool 28 may not update the temporary representation of the new configuration and may continue with the next volume (if any). As an alternative to informing the user of unsuccessful mappings during operation, the mapping tool may inform the user when the automatic mapping is complete (that is, at decision block 128, "yes" leg in FIG. 8).

In one embodiment, the flowchart of FIG. 8 may be part of the implementation of accepting user input (block 46 in FIG. 2). Once the quick map feature exits, in embodiments in which the quick map feature is part of the implementation of accepting user input, the updated temporary representation may be displayed for the user (after optional validation checking, etc.).

As mentioned above, in some embodiments a best fit feature may be provided (e.g. as a menu item under the action menu). The best fit feature may be provided to automatically map the volumes from the original configuration to the new configuration, attempting to optimize the mapping based on one or more user-selected attributes. That is, the volume attributes may be changed as part of the best fit feature. By using the best fit feature, most of the work of mapping the volumes to disks may be done. The user may then unmap volumes or modify volumes as desired using the result of the best fit.

Figure 9:
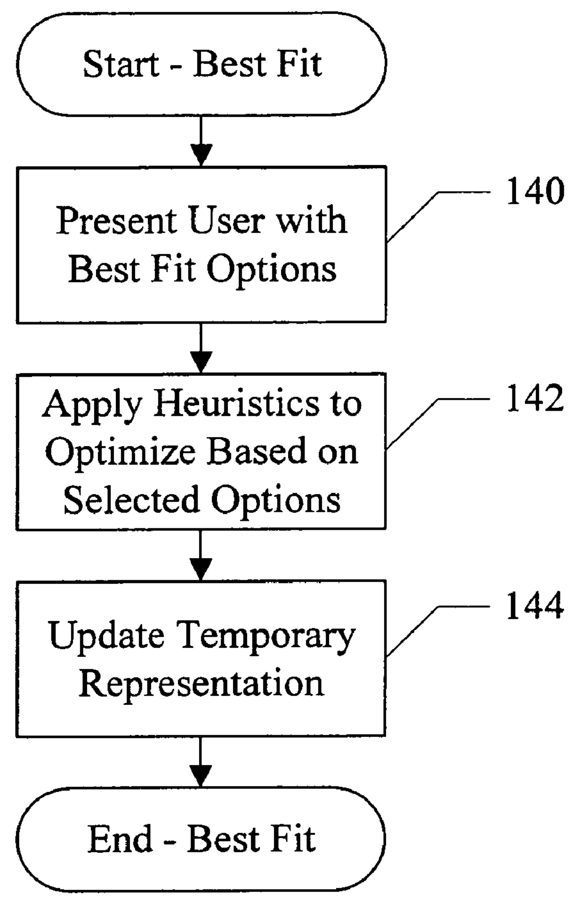
FIG. 9 is a flowchart illustrating operation of one embodiment of a best fit feature.

FIG. 9 is a flowchart illustrating one embodiment of the best fit feature. The mapping tool 28 may be implemented in software. In such embodiments, the mapping tool 28 may comprise instructions which, when executed, implement the flowchart shown in FIG. 9.

The mapping tool 28 may present the user with the best fit options (block 140). Any set of options may be provided in various embodiments. For example, optimization based on protection or performance may be provided. Options to maximize size or minimize size may also be provided. A user may, in some embodiments, select more than one option for optimization.

Once the user has selected the best fit options, the mapping tool 28 may apply various heuristics to optimize based on the selected options (block 142). For example, if optimization based on protection is selected, the mapping tool 28 may attempt to map each volume to a RAID-5 volume. If disk space on the new configuration does not permit RAID-5 volumes (or if there are not enough disks to implement RAID-5 or the client 18 doesn't support RAID-5), the mapping tool 28 may attempt to convert each volume to mirrored volumes or other RAID levels. If optimization based on performance is selected, the mapping tool 28 may attempt to map the volumes to striped volumes on two or more disks. If both optimizations are selected, the mapping tool 28 may attempt to convert each volume to both striped and either RAID or mirrored. If the maximize size option is selected, the mapping tool 28 may increase the size of the volumes to consume the space available on the disks in the client 18. If the minimize size option is selected, the mapping tool 28 may shrink the size of each volume to a minimum size for that volume while still providing enough storage to store the data backed up from that volume.

Once the optimization is complete, the mapping tool 28 may update the temporary representation of the new configuration to reflect the mappings generated via the optimization (block 144). In one embodiment, the flowchart of FIG. 9 may be part of the implementation of accepting user input (block 46 in FIG. 2). Once the best fit feature exits, in embodiments in which the best fit feature is part of the implementation of accepting user input, the updated temporary representation may be displayed for the user (after optional validation checking, etc.).

The above description has provided various details for an embodiment of the mapping tool 28 used to map volumes from an original configuration corresponding to a backed-up computer system to a new configuration corresponding to a client on which the backup is to be restored. However, other embodiments of the mapping tool may be used in other environments. For example, the mapping tool 28 may be used in a volume manager product. The original configuration may be the current configuration of volumes on a computer system managed by the volume manager. The new configuration may be a potential modification to the current configuration that is being modeled by the user. Once the user commits the modifications, the modified volume mappings may be created on the computer system. Similarly, a file system product may use the mapping tool 28, and the resources being mapped may be filesystems onto volumes. The original configuration may be the current filesystem configuration, and the new configuration may be a potential modification to the filesystem being considered by the user. In either the volume manager or filesystem case, a certain amount of disk space may be reserved for copying data to effect the changes. Alternatively, copying may be done through memory in the computer system.

In another embodiment, the mapping tool 28 may be used in a provisioning system (e.g. the VERITAS OpForce™ product). A provisioning system maintains a set of images of software resources for computer systems (including operating system, application software, etc.) and may remotely provision a computer system with a selected image. Typically, the images are created by installing the desired software on a computer system (either through provisioning or manual installation) and a snapshot of the disk(s) in the computer system is taken to capture the image. If a new image is desired, a system is provisioned and a new snapshot is taken. Using the mapping tool 28, an image to be modified may be displayed as the original configuration (e.g. various operating system and application software components may be displayed) and a new configuration may be created by the user from the original configuration with the desired modifications.

In yet another embodiment, various configuration software (for either software installation, such as Microsoft Windows™ add/delete software function, or for hardware configuration, such as various hardware configuration wizards) may employ the mapping tool 28. The original configuration may be a default configuration/installation, and the user may customize the new configuration using the original configuration and making any desired changes.

Accordingly, in general, each of the original configuration and the new configuration may comprise a plurality of computer system resources, where the computer system resources may comprise any combination of software, software configuration, and/or hardware configuration.

Figure 10:
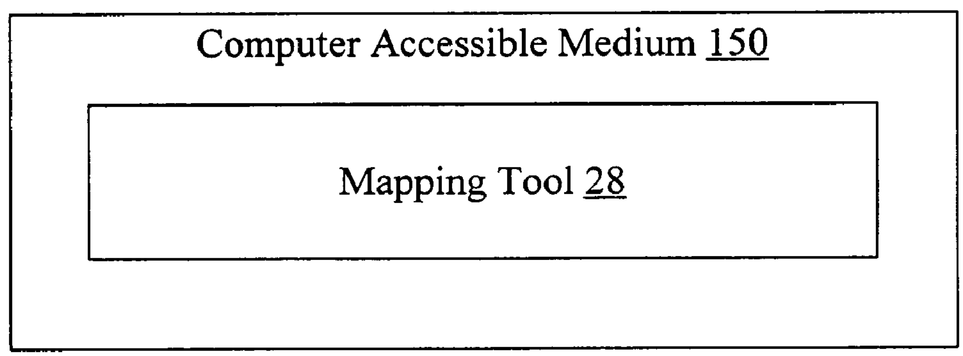
FIG. 10 is a block diagram of one embodiment of a computer accessible medium.

Turning now to FIG. 10, a block diagram of a computer accessible medium 150 is shown. Generally speaking, a computer accessible medium may include any media accessible by a computer during use to provide instructions and/or data to the computer. For example, a computer accessible medium may include storage media such as magnetic or optical media, e.g., disk (fixed or removable), CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., as well as media accessible via transmission media or signals such as electrical, electromagnetic, or digital signals, conveyed via a communication medium such as a network and/or a wireless link. The computer accessible medium 150 in FIG. 10 may be encoded with the mapping tool 28. The mapping tool 28 may comprise instructions which, when executed, implement the functionality described herein for the software. Generally, the computer accessible medium 150 may store any set of instructions which, when executed, implement a portion or all of the flowcharts shown in one or more of FIGS. 2-3 and 8-9. In some embodiments, a computer accessible medium similar to the computer accessible medium 150 may be included in a client 18 and/or the BMR server 10.

Numerous variations and modifications will become apparent to those skilled in the art once the above disclosure is fully appreciated. It is intended that the following claims be interpreted to embrace all such variations and modifications.

What is claimed is:

1. A computer accessible storage medium comprising a plurality of instructions which, when executed:

present a graphical view of a first computer system configuration comprising a first plurality of computer system resources;

concurrent with presenting the graphical view of the first computer system configuration, present a graphical view of a second computer system configuration comprising a second plurality of computer system resources;

provide a mechanism to capture data representing at least a first resource of the first plurality of computer system resources from the first computer system configuration and insert the data in the second computer system configuration; and provide an automatic mapping of resources from the first computer system configuration to the second computer system configuration, wherein the first computer system configuration corresponds to a backed-up computer system and the second computer system configuration corresponds to a computer system that the backup is being restored to.

2. The computer accessible storage medium as recited in claim 1 wherein the mechanism comprises a drag and drop mechanism.

3. The computer accessible storage medium as recited in claim 1 wherein the mechanism comprises a copy and paste mechanism.

4. The computer accessible storage medium as recited in claim 1 wherein the mechanism comprises a wizard configured to guide a user through a set of steps to capture and insert.

5. The computer accessible storage medium as recited in claim 4 wherein the set of steps further comprises providing the user with an opportunity to modify one or more properties of the first resource.

6. The computer accessible storage medium as recited in claim 1 wherein the plurality of instructions, when executed, further provide a mechanism to modify one or more properties of the first resource.

7. The computer accessible storage medium as recited in claim 1 wherein the first plurality of computer system resources comprises a first layout of one or more volumes on one or more storage devices, and wherein the second plurality of computer system resources comprises a second layout of one or more volumes on one or more storage devices.

8. The computer accessible storage medium as recited in claim 7 wherein the mechanism captures data representing a first volume from the first layout and inserts the data in the second layout.

9. The computer accessible storage medium as recited in claim 8 wherein the mechanism permits modification of one or more attributes of the first volume.

10. The computer accessible storage as recited in claim 1 wherein the second computer system configuration is a proposed configuration being developed by a user, and wherein modifications to the second computer system configuration are displayed in the graphical view but are not implemented on a target computer system until the user commits the modifications.

11. The computer accessible storage medium as recited in claim 1 wherein the automatic mapping includes attempting to optimize one or more user-selected properties.

12. A method comprising:

presenting a graphical view of a first computer system configuration comprising a first plurality of computer system resources, wherein the first computer system configuration corresponds to a backup of a computer system;

concurrently with presenting the graphical view of the first computer system, presenting a graphical view of a second computer system configuration comprising a second plurality of computer system resources, wherein the second computer system configuration corresponds to a target computer system on which a restore is to be performed; and providing a mechanism to capture data representing at least a first resource of the first plurality of computer system resources from the first computer system configuration and insert the data in the second computer system configuration.

13. The method as recited in claim 12 wherein the mechanism comprises a drag and drop mechanism.

14. The method as recited in claim 12 wherein the mechanism comprises a wizard configured to guide a user through a set of steps to capture and insert.

15. The method as recited in claim 12 further comprising providing a mechanism to modify one or more properties of the first resource.

16. The method as recited in claim 12 wherein the second computer system configuration is a proposed configuration being developed by a user, the method further comprising:

displaying modifications to the second computer system configuration in the graphical view; and implementing the modifications on a target computer system responsive to the user committing the modifications.

17. The method as recited in claim 12 further comprising automatically mapping resources from the first computer system configuration to the second computer system configuration.

18. The method as recited in claim 12 further comprising mapping resources from the first computer system configuration to the second computer system configuration, the mapping comprising attempting to optimize one or more user-selected properties.

19. A computer system configured, during use, to concurrently present a user of the computer system with graphical views of a first computer system configuration comprising a first plurality of computer system resources and a second computer system configuration comprising a second plurality of computer system resources, and wherein the computer system is further configured to provide the user with a mechanism to capture data representing at least a first resource of the first plurality of computer system resources from the first computer system configuration and insert the data in the second computer system configuration, and wherein the mechanism does not permit the user to change the first computer system configuration, and wherein the first computer system configuration corresponds to a backed-up computer system and the second computer system configuration corresponds to a computer system that the backup is being restored to.

20. The computer system as recited in claim 19 wherein the first computer system configuration and the second computer system configuration are configurations of a target computer system to which the computer system is coupled during use.

21. The computer system as recited in claim 19 further configured to provide the user with a mechanism to modify one or more properties of the first resource.

22. The computer system as recited in claim 19 wherein the second computer system configuration is a proposed configuration being developed by the user, and wherein the computer system is configured to display modifications to the second computer system configuration in the graphical view of the second computer system configuration, and wherein the computer system is configured to implement the modifications on a target computer system responsive to the user committing the modifications.

23. A computer accessible medium comprising a plurality of instructions which, when executed:

present a graphical view of a first configuration comprising a first one or more volumes mapped to a first one or more storage devices;

concurrent with presenting the graphical view of the first configuration, present a graphical view of a second configuration comprising a second one or more volumes to a second one or more storage devices; and provide a mechanism to capture data representing at least a first volume from the first configuration and insert the data in the second configuration, wherein the first configuration corresponds to a backed-up computer system and the second configuration corresponds to a computer system that the backup is being restored to.

24. The computer accessible storage medium as recited in claim 23 wherein the mechanism comprises a drag and drop mechanism.

25. The computer accessible storage medium as recited in claim 23 wherein the mechanism comprises a copy and paste mechanism.

26. The computer accessible storage medium as recited in claim 23 wherein the mechanism comprises a wizard configured to guide a user through a set of steps to capture and insert.

27. The computer accessible storage medium as recited in claim 23 wherein the plurality of instructions, when executed, further provide a mechanism to modify one or more attributes of the first volume.

28. The computer accessible storage medium as recited in claim 23 wherein the second configuration is a proposed configuration being developed by a user, and wherein modifications to the second configuration are displayed in the graphical view but are not implemented on a target computer system until the user commits the modifications.

29. The computer accessible storage medium as recited in claim 23 wherein the plurality of instructions, when executed, further provide an automatic mapping of from the first configuration to the second configuration.

30. The computer accessible storage medium as recited in claim 23 wherein the plurality of instructions, when executed, further provide a mapping from the first configuration to the second configuration, including attempting to optimize one or more user-selected properties.

31. A computer accessible storage medium comprising a plurality of instructions which, when executed:

present a graphical view of a first computer system configuration comprising a first plurality of computer system resources;

concurrent with presenting the graphical view of the first computer system configuration, present a graphical view of a second computer system configuration comprising a second plurality of computer system resources; and provide a mechanism to capture data representing at least a first resource of the first plurality of computer system resources from the first computer system configuration and insert the data in the second computer system configuration, wherein the second computer system configuration is a proposed configuration being developed by a user, and wherein modifications to the second computer system configuration are displayed in the graphical view but are not implemented on a target computer system until the user commits the modifications, and wherein the first computer system configuration corresponds to a backed-up computer system and the second computer system configuration corresponds to a computer system that the backup is being restored to.

32. The computer accessible storage medium as recited in claim 31 wherein the plurality of instructions, when executed, validate the second computer system configuration.

33. The computer accessible storage medium as recited in claim 32 wherein the validation is performed during the development of the proposed configuration.

34. The computer accessible storage medium as recited in claim 32 wherein the validation is performed subsequent to the commit.

35. The computer accessible storage medium as recited in claim 31 wherein the plurality of instructions, when executed, further provide a mechanism to modify one or more properties of the first resource.

36. The computer accessible storage medium as recited in claim 31 wherein the first plurality of computer system resources comprises a first layout of one or more volumes on one or more storage devices, and wherein the second plurality of computer system resources comprises a second layout of one or more volumes on one or more storage devices.

37. The computer accessible storage medium as recited in claim 36 wherein the mechanism captures data representing a first volume from the first layout and inserts the data in the second layout.

38. The computer accessible storage medium as recited in claim 37 wherein the mechanism permits modification of one or more attributes of the first volume.

* * * * *